United States Patent [19]
Hsia

[11] Patent Number: 6,010,587
[45] Date of Patent: Jan. 4, 2000

[54] FULL COLOR TRANSPLANTING PROCESS

[76] Inventor: Ben Ming Hsia, 27756 Ave. Mentry, Santa Clarita, Calif. 91355

[21] Appl. No.: 08/956,248

[22] Filed: Oct. 22, 1997

[51] Int. Cl.[7] .............................. B32B 31/12; B32B 31/26
[52] U.S. Cl. ......................... 156/153; 156/213; 156/215; 156/216; 156/253; 156/273.1; 156/277; 156/281; 156/309.6; 156/309.9
[58] Field of Search ...................................... 156/153, 213, 156/215, 216, 253, 273.1, 277, 281, 309.6, 309.9

[56] References Cited

U.S. PATENT DOCUMENTS

| | | | |
|---|---|---|---|
| 3,839,117 | 10/1974 | Amberg et al. ...................... | 156/277 X |
| 4,100,011 | 7/1978 | Foote .................................. | 156/277 X |
| 4,716,069 | 12/1987 | Burke . | |
| 5,258,214 | 11/1993 | Cooledge et al. ............... | 156/273.1 X |
| 5,804,285 | 9/1998 | Kobayashi et al . ............... | 156/277 X |

*Primary Examiner*—Curtis Mayes
*Attorney, Agent, or Firm*—David and Raymond; Raymond Y. Chan

[57] ABSTRACT

A full color transplanting process for providing a full color picture, drawing or printing permanently and evenly on an undulate surface of an object, including any irregular, uneven and undulate surface thereon. The process includes the following steps. Print a clear and flexible transplanting membrane with a predetermined picture, drawing or printing thereon, wherein the transplanting membrane has a surface area at least equal to a total surface area of a predetermined printing surface of an object. Clean the printing surface of the object thoroughly to clear all removable dirt and particles thereon. Pre-heat the object to a predetermined temperature between 150° F. and 300° F. Rub the printing surface of the object until the entire printing surface is provided with static electricity. Evenly attach the transplanting membrane on the printing surface of the pre-heated object by means of the static electricity provided on the printing surface until the whole printing surface is entirely covered by and fully in contact with the transplanting membrane. Evenly and fully heat the object in an oven at a predetermined temperature under the melting point of the material of the object for a predetermined period of time until the transplanting membrane is fully and integrally attached with the printing surface of the object. Cool the object to room temperature.

23 Claims, 4 Drawing Sheets

FULL COLOR TRANSPLANTING PROCESS

FIELD OF THE PRESENT INVENTION

The present invention relates to color printing process, and more particularly to a full color transplanting process which can integrally and evenly transplant most kinds of full color printing, drawing or picture on an irregular surface of an object made of plastic, foam rubber, fiber glass, carbon fiber, or their combination.

BACKGROUND OF THE PRESENT INVENTION

It is a well known skill to coat a color layer on a flat surface of a non-metallic object, such as plastic, rubber, foam rubber, fiber glass and carbon fiber by gluing a transparent plastic thin film having color figure pre-printed thereon onto the flat surface. The drawback of such coating method is well known too, that the plastic thin film can be lift over easily.

Mold printing is another conventional method to put color on a flat plastic surface. To print a color figure on a plastic surface, the figure must be first printed on a sticker. The sticker is pre-placed in the plastic injection mold. While injection, the paper of the sticker will be dissolved by the heat and the color figure will be firmly attach on the plastic surface. However, this mold printing method can only be applied on a flat or circular surface. For an irregular and undulate surface, the color figure would be damaged due to the wrinkles formed thereon.

Gold ironing is another common method of providing figure on a flat plastic or metallic surface. A figure made of metallic ink foil must be pre-attached on a paper, pressure and heat must be applied on the paper for ironing the metallic ink foil on the plastic or metallic surface. This method is also limited to apply on a flat surface. Moreover, the surface of a plastic object may be depressed and stamped to form a sunken area.

Nowadays, most of the ornamental designs of products contain curve and undulate surface, but we can only provide simple decorating figure on those flat surfaces by means of the conventional printing method mentioned above. Therefore, most of the merchandises can merely be designed with single color or simple combination of two to three colors. In fact, at the time of this invention, no product can provide full color picture, drawing or printing all over the entire surface thereof like the paper printing does. Moreover, more and more products are made of more than one materials. No present technology teaches a relatively low cost and simple process to continuously provide a full color picture, drawing or printing across an uneven surface constituted by two different materials, such as foam rubber and plastic.

SUMMARY OF THE PRESENT INVENTION

It is thus a main objective of the present invention to provide a full color transplanting process which can provide a full color picture, drawing or printing on an undulate surface of an object.

A further objective of the present invention is to provide a full color transplanting process which can provide a full color picture, drawing or printing on an entire surface of an object, including any uneven surface thereon.

Yet another objective of the present invention is to provide a full color transplanting process which can continuously provide a full color picture, drawing or printing across an uneven surface constituted by two different materials.

Still another objective of the present invention is to provide a full color transplanting process having relatively low cost and simple steps.

Still another objective of the present invention is to provide a full color transplanting process which can easily transplant any kind of picture, drawing or printing on the desired surface of an object.

Accordingly, in order to achieve the above objectives, the present invention provides a full color transplanting process which comprises the following steps:

(a) Print a clear and flexible transplanting membrane with a predetermined picture, drawing or printing thereon, wherein the transplanting membrane has a surface area at least equal to a total surface area of a predetermined printing surface of an object.

(b) Clean the printing surface of the object thoroughly to clear all removable dirt and particles thereon.

(c) Pre-heat the object to a predetermined temperature between 150° F. and 300° F.

(d) Rub the printing surface of the object until the entire printing surface is provided with static electricity.

(e) Evenly attach the transplanting membrane on the printing surface of the pre-heated object by means of the static electricity provided on the printing surface until the whole printing surface is entirely covered by and fully in contact with the transplanting membrane.

(f) Evenly and fully heat the object in an oven at a predetermined temperature under the melting point of the material of the object for a predetermined period of time until the transplanting membrane is fully and integrally attached with the printing surface of the object.

(g) Cool the object to room temperature.

DETAILED DESCRIPTION OF THE PREFERRED EMBODIMENT

Figure 1:
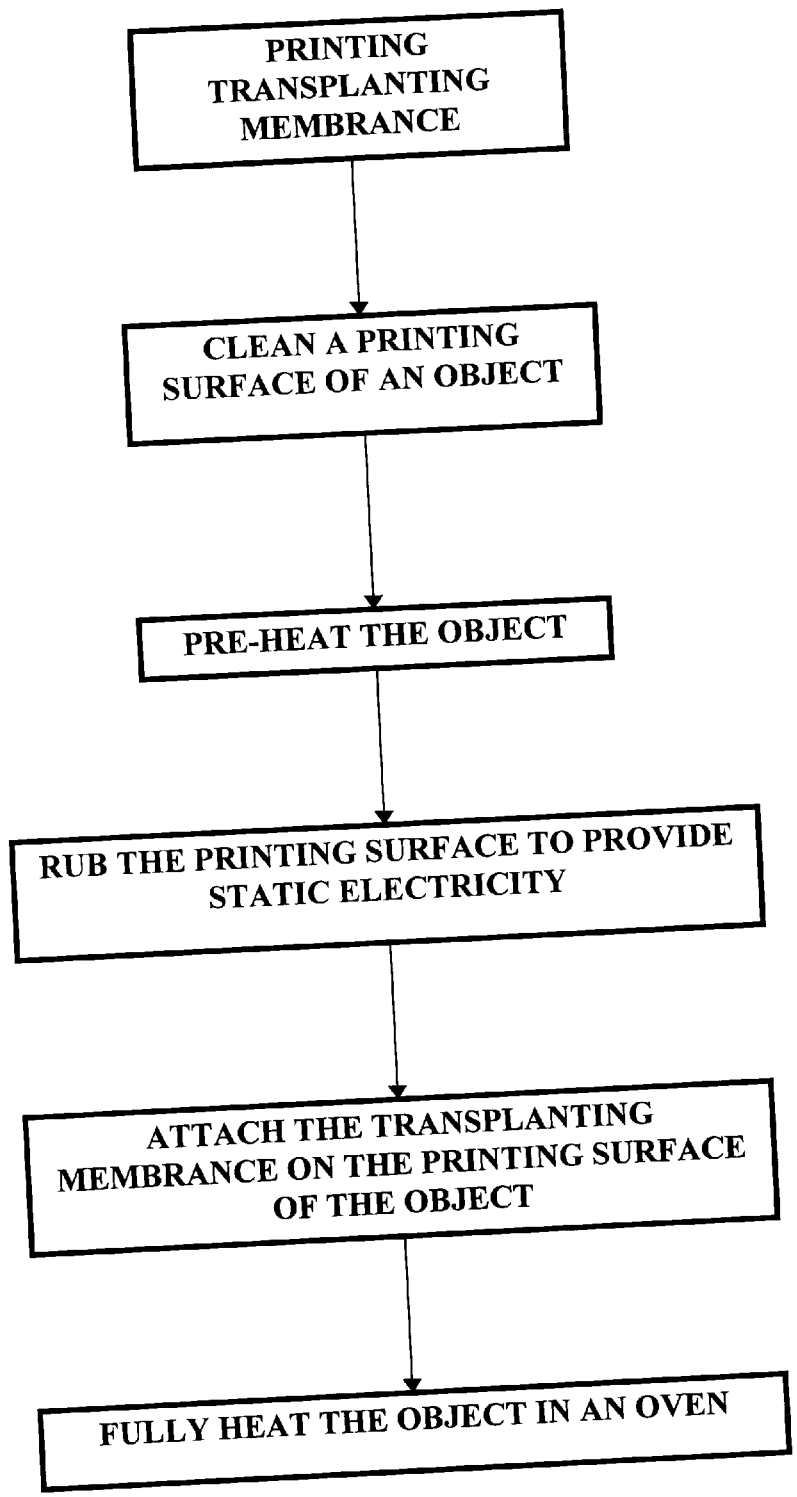
FIG. 1 is a block diagram of a full color transplanting process in accordance with a preferred embodiment of the present invention.

Since plastic material was invented, plastic can only be manufactured with single color. Simple figure is allowed to be coated on the flat surface of plastic object through the conventional coating, mold printing or gold ironing methods only. It is nearly impossible to have an undulate plastic surface or the whole plastic object provided with complicate full color picture, drawing or printing. Similar material like rubber, foam rubber, EVA, ABS, fiber glass, and carbon fiber suffer the same problem that greatly limits the ornamental design of non-metallic products. It would be an amazing thing that if a colorful picture is capable of providing on any plastic surface, but the method disclosed hereunder can achieve such remarkable goal.

The present invention provides a full color transplanting process which generally comprises the following steps:

(a) Print a clear and flexible transplanting membrane with a predetermined picture, drawing or printing thereon, wherein the transplanting membrane has a surface area at least equal to a total surface area of a predetermined printing surface of an object.

(b) Clean the printing surface of the object thoroughly to clear all removable dirt and particles thereon.

(c) Pre-heat the object to a predetermined temperature between 150° F. and 300° F.

(d) Rub the printing surface of the object until the entire printing surface is provided with static electricity.

(e) Evenly attach the transplanting membrane on the printing surface of the pre-heated object by means of the static electricity provided on the printing surface until the whole printing surface is entirely covered by and fully in contact with the transplanting membrane.

(f) Evenly and fully heat the object in an oven at a predetermined temperature under the melting point of the material of the object for a predetermined period of time until the transplanting membrane is fully and integrally attached with the printing surface of the object.

(g) Cool the object to room temperature.

In step (a), any desired picture, design, drawing, or printing can be printed on the transplanting membrane by the following steps:

(a-1) picturing a normal picture, poster, printing, or drawing;

(a-2) similar to the color printing, providing different color films through chromatographic analysis by color scanner or computer; and then (a-3) printing such picture on the clear and flexible transplanting membrane simply by lithographic printing or color printing.

If the pictorial transplanting membrane is prepared for transplanting on a plastic surface, a thinner membrane is used while a thicker membrane is used for metallic surface. According to the present invention, the full color picture can evenly be transplanted on the entire surface of the object or merely a predetermined portion of the object, wherein the surface ready for transplanting full picture thereon is considered as the printing surface that it can be the entire surface of the object or only the predetermined portion of the object.

In step (b), in order to ensure that the best full color transplanting effect can be achieved, all removable dirt or particles are preferable to be cleaned from the printing surface. This cleaning step is strongly suggested to process so as to prevent the residual particles on the printing surface from propping up the transplanting picture after the transplanting membrane is fully attached on the printing surface.

The pre-heating step (c) is essential in the present invention because the increase of the temperature of the printing surface can enhance the attachment of the transplanting membrane on the printing surface of the object. Moreover, when heat is applied to the object in the fully heating step (f), the heat is conducted from the surface molecules gradually to the interior molecules. If the object is heated from room temperature in step (f), it may take long time for the entire object being heated to the predetermined temperature.

However, since the transplanting membrane is fully in contact with the printing surface of the object during, the step (f), the transplanting membrane may be overheated before it is integrally attached and united with the printing surface of the object. Accordingly, the pre-heating step (c), which firstly pre-heats the entire object to a certain temperature 150° F. of 300° F. membrane is wrapped thereon, can substantially reduce the heating time of the final fully-heating step (f) but ensuring the best attaching effect of the transplanting membrane on the printing surface without affecting the color and nature of the transplanting membrane.

When the printing surface is made of plastic, ABS, fiber glass, or carbon fiber, the object is preferably to be pre-heated to not more than 180° F. When the printing surface is made of foaming material or foam rubber, the object is preferably to be pre-heated to a temperature not more than 150° F. When the printing surface is made of metallic material, the object is preferably to be pre-heated to a temperature between 250° F. and 270° F. However, if the object is made of more than one material, the object should be pre-heated to a temperature not more than the above suggested range of the material which has the lower pre-heating temperature than the other. For example, if the object contains the components made of plastic and foam rubber, the whole object should be pre-heated to not more than 150° F.

No gluing substance is needed for the full color transplanting process of the present invention, that not only may save the cost but also can eliminate the complicate process of evenly applying the glue on the printing surface. According to the present invention, the transplanting membrane is attached on the printing surface of the object by means of static electricity. It is well known that two surfaces have the tendency of attaching with each other if static electricity is formed therebetween. Basically, static electricity may probably formed on the transplanting membrane and the printing surface that would bring the transplanting membrane attaching on the printing surface. In order to ensure the attachment between the transplanting membrane and the printing surface, the rubbing step (d) is processed by rubbing the printing surface of the object with a cloth or fabric to evenly provide the required static electricity thereon.

In order to achieve a better attachment between the transplanting membrane and the printing surface of the object, an additional step can be added before or after the cleaning step (b) by slightly grinding the printing surface with a cloth or fabric to provide a tiny sanded surface on the printing surface. This additional step is especially important when the printing surface is made of foaming material or foam rubber. The sanded printing surface can enhance the attachment between the transplanting membrane and the sanded printing surface because the transplanting membrane would bite into the sanded printed surface after the fully-heating step (f).

Figure 2:
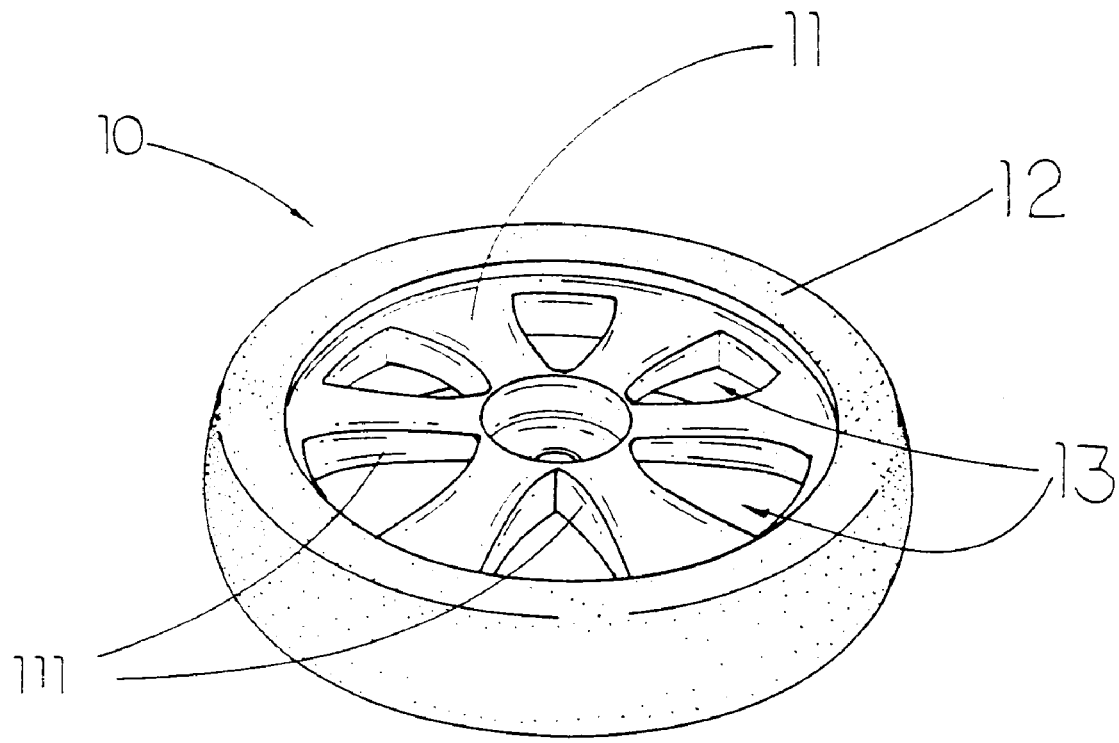
FIG. 2 is a perspective view of a stroller wheel embodying an object having irregular and undulate surface to be transplanted with color picture thereon in accordance with the preferred embodiment of the present invention.

In step (e), the transplanting membrane is evenly attached on the printing surface of the pre-heated object by means of the static electricity provided on the printing surface. Referring to FIGS. 2 to 5, a stroller wheel 10 is embodied as the object which entire surface should be entirely covered by and fully in contact with the transplanting membrane. The stroller wheel 10 contains various irregular and undulate printing surfaces and comprises a plastic made supporting wheel 11 and a foam rubber made wheel tire peripherally mounted around the supporting wheel 11, as shown in FIG. 2.

To coat or print a color picture, drawing or printing all over the supporting wheel 11 is already a very difficult task due to the substantial difficulties of providing such color printing on the inner sides 111 of the holes 13 provided on the supporting wheel 11 by means of the conventional coating or mold printing method. It is nearly impossible to provide a full color picture, drawing or printing permanently and continuously all over the entire exterior surface of the stroller wheel, including the plastic supporting wheel 11 and the foam rubber wheel tire 12, because there does not exist a suitable conventional art to permanently and perfectly coat or print the desired picture, drawing or printing across different materials.

Figure 3:
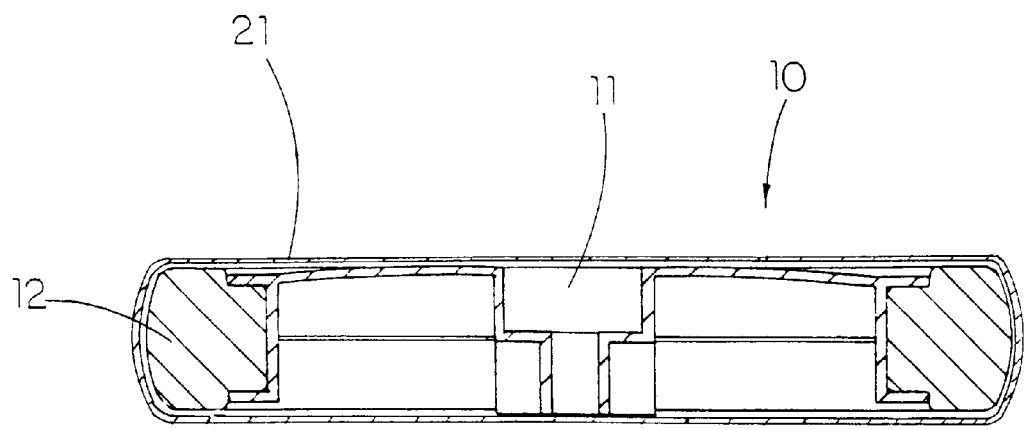
FIG. 3 is a sectional view of the stroller wheel as shown in FIG. 2, wherein a transplanting membrane is wrapped over the stroller wheel.

When the entire exterior surface of the stroller wheel 10 is considered as the printing surface and the transplanting membrane must be transplanted on the entire exterior surface, the step (e) comprises the following sub-steps:

(e-1) As shown in FIG. 3, wrap the transplanting membrane 21 over the entire stroller wheel 10 until all outer contour of the stroller wheel 10 is in well contact with the transplanting membrane 21.

Figure 4:
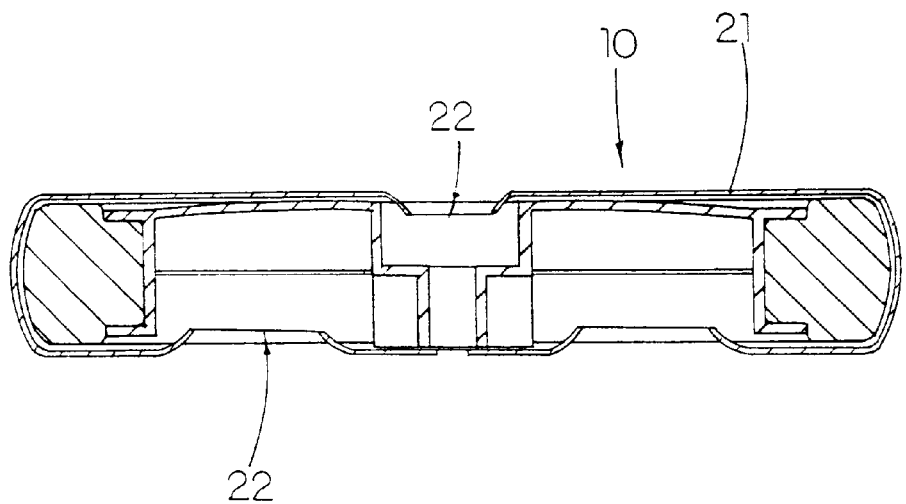
FIG. 4 is a sectional view of the stroller wheel as shown in FIG. 2, wherein openings are made on the transplanting membrane at portions right above the holes or indention of the stroller wheel.

(e-2) As shown in FIG. 4, form a plurality of openings 22 on the transplanting membrane 21 at positions just right above the holes 13 of the supporting wheel 11 respectively.

Figure 5:
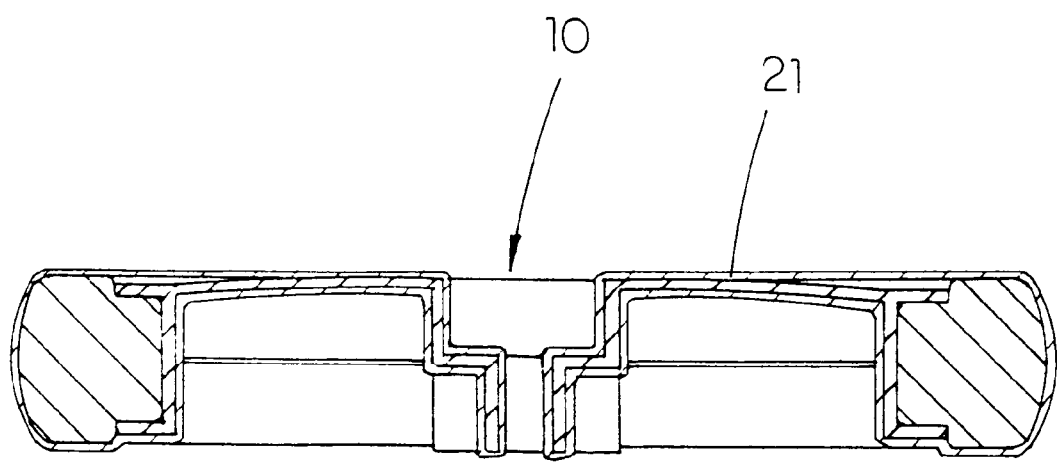
FIG. 5 is a sectional view of the stroller wheel, as shown in FIG. 2, wherein the transplanting membrane is fully in contact with all the printing surfaces of the stroller wheel.

(e-3) As shown in FIG. 5, evenly attach the transplanting membrane 21 on the printing surface, i.e. the entire exterior surface, of the stroller wheel 10 by means of the static electricity provided on the printing surface until the whole printing surface is entirely covered by and fully in contact with the transplanting membrane 21, wherein the transplanting membrane 21 can be stretched out to cover and attach on every corner or undulate curve of the printing surface due to the flexible nature of the transplanting membrane 21.

In the fully heating step (f), heat must be evenly applied in all direction onto the object or keep the object rotating within the oven to ensure every portion of the printing surface is evenly heated to the predetermined temperature for about 1 to 2 minutes. When the object is made of plastic, ABC, fiber glass, or carbon fiber, the object should be heated between 400° F. and its melting temperature, preferably at 460° F. When the object is made of foaming material or foam rubber, the object should be heated between 300° F. and 420° F., preferably at 370° F. When the object is made of metallic material, the object should be heated between 600° F. and 1100° F., preferably at 600° F. Moreover, if the object is made of two kinds of material, such as the stroller wheel 10 disclosed in FIGS. 2 to 5, the object should be heated at the adequate temperature for the constructing material having the lower predetermined temperature for a slightly longer of time, that is the adequate temperature 370° F. of the foam rubber made wheel tire 12 for the stroller wheel 10.

The fully heating step (f) can be carried out by feeding the object to pass through the oven which has a length of 60 feet at a speed of one foot per second. Furthermore, while feeding through the heating oven, each object is driven to rotate slowly and steadily for ensuring evenly heating effect and the transplanting membrane be integrally and permanently transplanted on the printing surface of the object. The outputting heated object can thus be cooled down to room temperature.

Accordingly, by means of the full color transplanting process of the present invention, a full color picture, drawing or printing can be permanently and evenly transplanted and provided on an undulate surface of an object, including any irregular, uneven and undulate surface thereon. Moreover, the full color transplanting process of the present invention can also continuously provide a full color picture, drawing or printing across an uneven surface constituted by two different materials, and that the process is simple to operate and has a relatively low manufacturing cost. It is also worth to mention that although the full color transplanting process of the present invention performs very good effects for plastic or foaming material made object, the process is also adaptable to be applied to metallic surface.

What is claimed is:

1. A full color transplanting process, comprising the steps of:

(a) printing a clear and flexible transplanting membrane with a predetermined picture, drawing or printing thereon, wherein said transplanting membrane has a surface area at least equal to a total surface area of a predetermined printing surface of an object;

(b) cleaning said printing surface of said object thoroughly to clear all removable dirt and particles thereon;

(c) pre-heating said object to a predetermined temperature;

(d) rubbing said printing surface of said object until said entire printing surface is provided with static electricity;

(e) evenly attaching said transplanting membrane on said printing surface of said pre-heated object by means of said static electricity provided on said printing surface until said whole printing surface is entirely covered by and fully in contact with said transplanting membrane;

(f) evenly and fully heating said object at a predetermined temperature under a melting point of said object for a predetermined period of time until said transplanting membrane is fully and integrally attached with said printing surface of said object; and (g) cooling said object to room temperature.

2. A full color transplanting process, as recited in claim 1, in the step (c), wherein said object is pre-heated at a temperature between 150° F. and 300° F.

3. A full color transplanting process, as recited in claim 2, in the step (f), said heat must be evenly applied in all direction onto said object by keeping said object rotating within an oven to ensure every portion of said printing surface is evenly heated to said predetermined temperature.

4. A full color transplanting process, as recited in claim 3, in the step (f), wherein when said object is made of foaming material, said object is heated between 300° F. and 420° F.

5. A full color transplanting process, as recited in claim 3, in the step (f), wherein when said object is made of foaming material, said object is heated at 370° F.

6. A full color transplanting process, as recited in claim 3, in the step (f), wherein when said object is made of metallic material, said object is heated between 600° F. and 1100° F.

7. A full color transplanting process, as recited in claim 3, in the step (f), wherein when said object is made of foaming material, said object is heated at 600° F.

8. A full color transplanting process, as recited in claim 3, in the step (f), wherein when said object is made of more than one kinds of material, said object is heated at an adequate temperature for said material that has a lower predetermined temperature than the other materials for a longer amount slightly longer of time.

9. A full color transplanting process, as recited in claim 1, in the step (c), wherein when said printing surface is made of plastic, ABS, fiber glass, or carbon fiber, said object is pre-heated to not more than 180° F.

10. A full color transplanting process, as recited in claim 1, in the step (c), wherein when said printing surface is made of foaming material, said object is pre-heated to a temperature not more than 150° F.

11. A full color transplanting process, as recited in claim 1, in the step (c), wherein when said printing surface is made of metallic material, said object is pre-heated to a temperature between 250° F. and 270° F.

12. A full color transplanting process, as recited in claim 1, in the step (c), wherein when said object is made of more than one kinds of material, said object is pre-heated to a temperature not more than an adequate heating temperature of the material which has a lower pre-heating temperature than the other material.

13. A full color transplanting process, as recited in claim 12, in the step (f), wherein said object is heated at an adequate temperature for said material that has a lower predetermined temperature than the other materials for a longer amount slightly longer of time.

14. A full color transplanting process, as recited in claim 1, in the step (f), said heat must be evenly applied in all direction onto said object by keeping said object rotating within an oven to ensure every portion of said printing surface is evenly heated to said predetermined temperature.

15. A full color transplanting process, as recited in claim 14, in the step (f), wherein when said object is made of foaming material, said object is heated between 300° F. and 420° F.

16. A full color transplanting process, as recited in claim 14, in step (f), wherein when said object is made of foaming material, said object is heated at 370° F.

17. A full color transplanting process, as recited in claim 1, in the step (f), wherein when said object is made of plastic, ABS, fiber glass, or carbon fiber, said object is heated between 400° F. and a melting temperature thereof.

18. A full color transplanting process, as recited in claim 1, in the step (f), wherein when said object is made of plastic, ABS, fiber glass, or carbon fiber, said object is heated at 460° F.

19. A full color transplanting process, as recited in claim 1, in the step (a), further comprising the steps of:

(a-1) picturing a picture, drawing or printing;

(a-2) providing different color films through chromatographic analysis; and (a-3) printing said picture, drawing or printing on said clear and flexible transplanting membrane simply by lithographic printing or color printing.

20. A full color transplanting process, as recited in claim 1, in the step (d), wherein said printing surface of said object is rubbed with a cloth or fabric to evenly provide said static electricity thereon.

21. A full color transplanting process, as recited in claim 1, before the step (b), further comprising an additional step of grinding said printing surface with a cloth or fabric to provide a tiny sanded surface on said printing surface.

22. A full color transplanting process, as recited in claim 1, after the step (b), further comprising an additional step of grinding said printing surface with a cloth or fabric to provide a tiny sanded surface on said printing surface.

23. A full color transplanting process, as recited in claim 1, in the step (e), further comprising the steps of:

(e-1) wrapping said transplanting membrane over said object until all outer contour of said object is in well contact with said transplanting membrane;

(e-2) forming a plurality of openings on said transplanting membrane at positions just right above a plurality of respective holes formed on said object respectively; and (e-3) evenly attaching said transplanting membrane on said printing surface of said object by means of said static electricity provided on said printing surface until said whole printing surface is entirely covered by and fully in contact with said transplanting membrane, wherein said transplanting membrane is stretched out to cover and attach on every corner or undulate curve of said printing surface due to the flexible nature of said transplanting membrane.

* * * * *